United States Patent [19]
Dubois et al.

[11] Patent Number: 5,771,092
[45] Date of Patent: Jun. 23, 1998

[54] WAVELENGTH AGILE RECEIVER WITH NOISE NEUTRALIZATION AND ANGULAR LOCALIZATION CAPABILITIES (WARNALOC)

[75] Inventors: Jacques Dubois, Neufchatel; Sophie LaRochelle, Cap Rouge, both of Canada

[73] Assignee: Her Majesty the Queen in right of Canada, as represented by the Minister of National Defence, Ottawa, Canada

[21] Appl. No.: 848,462
[22] Filed: May 8, 1997
[51] Int. Cl.$^6$ ................................................. G01C 1/00
[52] U.S. Cl. ................... 356/147; 356/138; 356/416; 356/152
[58] Field of Search ................................. 356/138, 141, 356/152, 146, 147, 416

[56] References Cited

U.S. PATENT DOCUMENTS

| | | | |
|---|---|---|---|
| 3,706,493 | 12/1972 | Redman | 356/4 |
| 3,858,201 | 12/1974 | Foster | 340/347 P |
| 4,857,721 | 8/1989 | Dunavan et al. | |
| 4,946,277 | 8/1990 | Marquet et al. | |
| 5,280,167 | 1/1994 | Dubois | |
| 5,428,215 | 6/1995 | Dubois et al. | |
| 5,604,695 | 2/1997 | Cantin et al. | |

Primary Examiner—Frank G. Font
Assistant Examiner—Reginald A. Ratliff
Attorney, Agent, or Firm—Larson & Taylor

[57] ABSTRACT

A tunable wavelength agile opto-electronic device for detecting and determining an angle of arrival of a collimated beam of radiation comprising a linearly variable optical filter superimposed over an elongated detector having at least one radiation detector element in each quadrant of the detector. Radiation that transverses that filter projects an image of a first portion of the filter onto two adjacent detector elements in separate quadrants at a first end of the elongated detector and an equal size image of a second portion of the filter onto two adjacent detector elements in separate quadrants at a second end of the elongated detector. A signal generated by radiation that transverses the filter onto a detector element in a quadrant at the second end is subtracted from a signal generated by radiation that transverses the filter onto an aligned detector element at the first end of the elongated detector to provide two difference signals, one for each side of the elongated detector. That subtraction reduces noise generated by background radiation to enable easier detection of a collimated beam and processing electronics use the two difference signals to determine the angle of arrival of such a collimated beam. In one embodiment, a liquid crystal bar graph is located between the filter and the detector which, under control of a control unit, forms two transparent narrow apertures at selected positions so that an image of one aperture forms on quadrant detectors at the first end and the second aperture on quadrant detector at the second end.

10 Claims, 3 Drawing Sheets

WAVELENGTH AGILE RECEIVER WITH NOISE NEUTRALIZATION AND ANGULAR LOCALIZATION CAPABILITIES (WARNALOC)

FIELD OF THE INVENTION

The present invention relates to a laser warning receiver (LWR) for protecting military platforms against laser guided weapons by detecting, identifying and locating the laser sources associated with those weapons and in particular to receivers which can detect radiation from very low power laser sources, such as those for laser beam rider (LBR) systems, with a high angular resolution in the determination of the angle of arrival of a laser beam from those sources.

BACKGROUND OF THE INVENTION

Many research laboratories and manufactures around the world are presently involved in the development of laser warning receivers (LWR)s for the purpose of protecting military platforms against laser guided weapons by detecting, identifying and locating the laser sources associated with those weapons. A high angular resolution in the determination of the angle of arrival of laser radiation associated with laser guided weapons is essential in order to effectively optimize the deployment of counter measures against those weapons. However, the majority of existing LWRs are only capable of detecting and locating powerful laser sources such as laser range finders (LRF)s and laser target designators (LTD)s which generate relatively high levels of power density when they irradiate a LWR. Very low power lasers (VLPL)s, such as ones for laser beam rider (LBR) systems, still remain undetected or are detected too late by these existing LWRs since the irradiance a VLPL provides at a target location is, most of the time, several order of magnitude below the detection threshold of these types of receivers. This problem arises from the relatively high level of background radiation, such as the sun, that these LWRs have to handle when attempting to detect a laser source. The signal from a VLPL source is often buried in this background radiation and remains undetected by the majority of existing LWRs.

Various techniques have been developed for the detection of laser sources. These generally have used either shadow masks, fibre optic bundles, lenses, coherence discriminators or holography to achieve detection and, for a few of these techniques, provide an accurate location of a laser source. The LWRs which are based on those techniques can effectively provide the desired angular resolution but lack the very low detection threshold required for the detection of VLPL sources such as those used by LBR systems. The VLPL source detection techniques that generally have been used provide only a very low accuracy in the location of a laser source, typically a quadrant, and this is totally unsuitable for any optimized countermeasure (CM) deployment.

Some of the existing LWRs feature a dedicated VLPL detection channel wherein a relatively narrow-band optical filter is used to reduce the level of background radiation in order to achieve the required low detection threshold. The bandwidth of this filter is fixed and selected to allow transmission of wavelengths that are generated by known VLPLs. There are several problems with an approach which uses that type of optical filter. The first problem is that the filter cannot be made narrow enough to effectively block the background radiation while still allowing transmission of wavelengths generated by various known VLPLs. Detection of laser sources is only possible in a rather limited and fixed optical bandwidth tuned to the wavelengths generated by known VLPLs. Therefore, such an optical filter would not provide a suitable low detection threshold while permitting the detection of new or unknown VLPLs operating outside of that bandwidth.

Techniques based on optical processing or signal correlation for detecting and locating VLPLs have been studied but these lead to very expensive devices with, generally, a small field-of-view (FOV) which is typically smaller than 25°. U.S. Pat. No. 5,280,167 by Jacques Dubois which issued on Jan. 18, 1994, describes one system for detecting VLPLs, such as those for LBR systems, and provide a very high angular resolution in determining the location of that source. The receiver in this system includes a receiver with a lens/filter arrangement for a large area photodetector to detect a signal from a VLPL with a high gain amplifier to amplify the signal, the amplified signal being applied to a synchronization generator to generate a digital pulse train with pulses corresponding to peaks in the detected signal. That digital pulse train is then analyzed in a code breaker and a further code is generated anticipating the arrival of further pulses which are applied to a time gate generator that controls the high voltage of a gated image intensifier coupled to a video camera. Gating of the image intensifier is synchronized, as a result, with coded emissions from the VLPL source so that a video image from the camera can be displayed on a monitor and more easily differentiated from the background.

SUMMARY OF THE INVENTION

It is an object of the present invention to provide a laser warning receiver (LWR) that has a very low detection threshold suitable for a very low power laser (VLPL) beam detection that, simultaneously, includes false alarm rejection, a wide field-of-view (FOV) and a high angular resolution in the determination of the angle of arrival of radiation from a VLPL source.

An opto-electronic device for detecting a collimated beam of radiation according to one embodiment of the present invention comprises a linearly variable optical filter superimposed over, but spaced from, an elongated detector having a plurality of radiation detector elements with at least one detector element extending perpendicular to the length of the elongated detector being located in each quadrant of the elongated detector, which elements have a width W' in a direction perpendicular to the length of the elongated detector, wherein radiation that transverses said filter projects an image of at least a first portion of the filter onto at least two adjacent detectors, each of which are located in separate ones of two quadrants at one end of the elongated detector, and also projects an image of at least a second portion of the filter onto at least two adjacent detectors, each of which are located in separate ones of two quadrants at another end of the detector, the width W of those images at a location where they are projected onto the elongated detector being ≦ the width W' of each detector element; the first and second portions having substantially the same dimensions with the device having means for subtracting a signal generated by radiation that transverses said filter onto at least one detector in a quadrant at said another end from a signal generated by radiation that transverses said filter onto at least one detector in an aligned quadrant at said one end to provide two difference signals at outputs which are connected to processing electronics, the means for subtracting reducing noise generated by background radiation to enable easier detection of a narrow optical band collimated beam of radiation, the processing electronics having means to determine the direction of arrival in one plane of such a collimated beam of radiation from said difference signals.

An opto-electronic device for detecting a collimated beam of radiation according to a further embodiment of the invention comprises a linearly variable optical filter superimposed over, but spaced from, an elongated quadrant detector having a single radiation detector element in each quadrant of the detector, a liquid crystal display being located between the optical filter and quadrant detector at a distance h from the quadrant detector, the liquid crystal display being connected to a control unit designed to form at least two narrow rectangular transparent apertures at selected locations in the liquid crystal display wherein the narrow apertures are perpendicular to the length of elongated quadrant detector and have a width perpendicular to the length of the elongated quadrant detector < the width W' of a detector element, the liquid crystal display being centered over a center line located along the length of the elongated quadrant detector, one aperture being located above two adjacent detector elements at one end of the quadrant detector with a second aperture being located above two adjacent detector elements at another end of the quadrant detector wherein radiation that transverses said apertures project images of said apertures onto detector elements; the images having substantially the same dimensions with a width W perpendicular to the length of the elongated quadrant detector where W≦W', the device having means for subtracting a signal generated by radiation that transverses said second aperture onto a detector at said another end from a signal generated by radiation that transverses said one aperture onto an aligned detector at said one end to provide two difference signals at two outputs which are connected to processing electronics, the means for subtracting reducing noise generated by background radiation to enable easier detection of a narrow optical band collimated beam of radiation, the processing electronics having means to determine the direction of arrival in one plane of such a collimated beam of radiation from the differences signals.

An opto-electronic device for detecting a collimated beam of radiation according to a still further embodiment of the invention comprises a linearly variable optical filter superimposed over an elongated detector having a plurality of narrow radiation detector elements that extend perpendicular to the length of the elongated detector in two adjacent arrays that extend along said length, the optical filter being located at a distance h' from the elongated detector and centered over a line between the two arrays with the width of the filter being < the width W' of the detector elements in an array wherein radiation that transverses said filter projects an image onto the arrays, which image has a width W perpendicular to the detectors length where W≦W', the arrays being divided into two sections with all the detector elements located in a half of each array at one end of the elongated detector being connected to inputs of a multiplexer and all the detector elements located in a half of that array at another end of the elongated detector being connected to inputs of another multiplexer; the multiplexers being connected to a control unit that determines which detector elements outputs are selected for further processing, the device having means for subtracting signals transferred by a multiplexer connected to detector elements in an array at said another end from signals transferred by a multiplexer connected to detector elements in that array at said one end to provide two difference signals at two outputs which are connected to processing electronics, the means for subtracting reducing noise generated by background radiation to enable easier detection of a narrow optical band collimated beam of radiation, the processing electronics having means to determine the direction of arrival in one plane of such a collimated beam of radiation from said difference signals.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
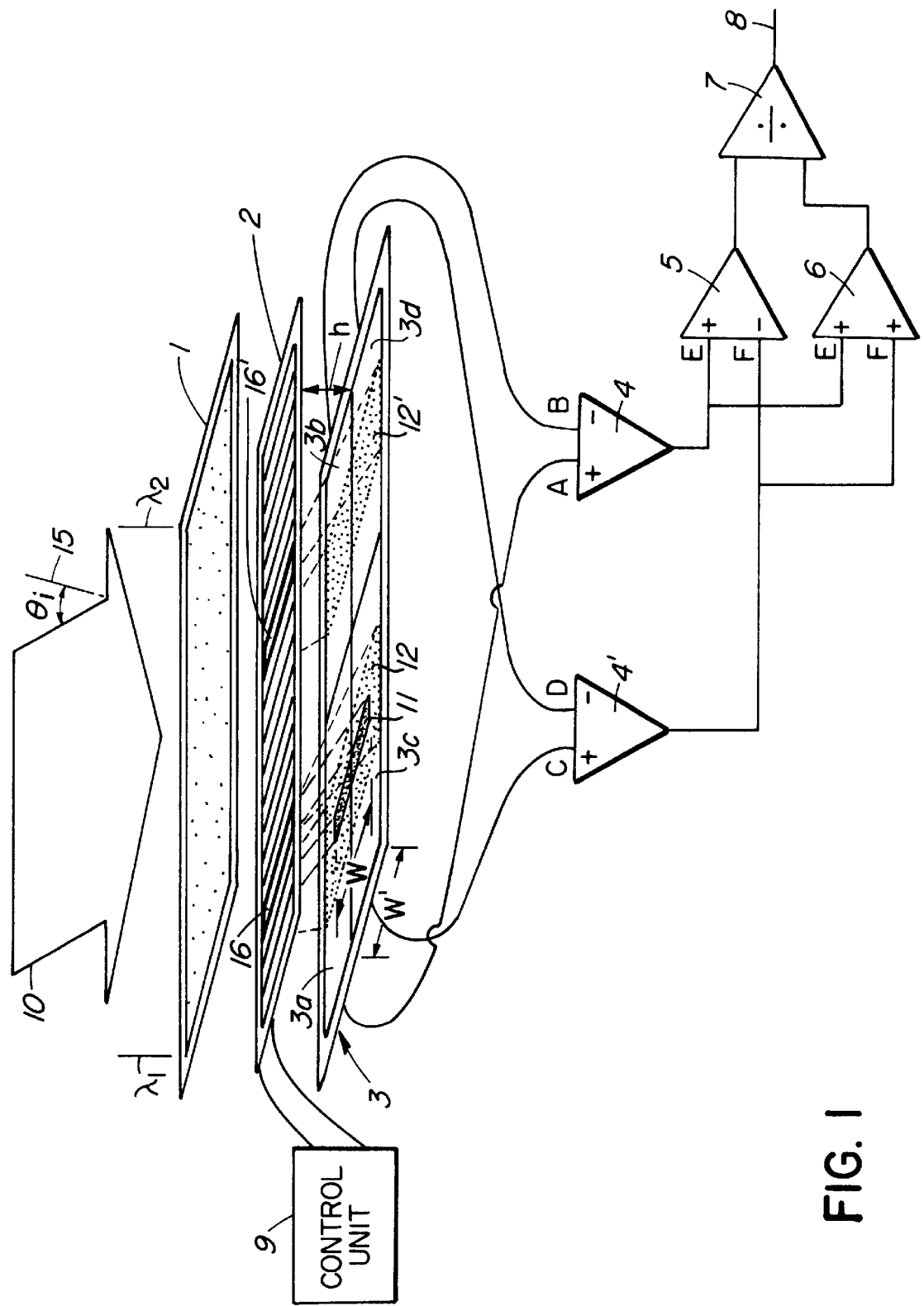
FIG. 1 illustrates a laser warning receiver (LWR) according to one embodiment of the present invention.

The laser warning receiver (LWR) according to the present invention, such as the embodiment in FIG. 1, is suitable for very low power laser (VLPL) beam detection and localization by a wavelength agile receiver with noise neutralization and angular localization capabilities (WARNNALOC). That receiver includes a linear variable optical filter 1 located above a liquid crystal display (LCD) bar graph 2 with a quadrant detector 3 positioned beneath the LCD 2. The LCD 2 is located at a height h above detector 3.

The optical filter 1 is linearly variable (spectrally) along its length between $\lambda_1$ and $\lambda_2$, i.e. the filter is transmissive for the wavelength $\lambda_1$ at one end and transmissive for the wavelength $\lambda_2$ at its other end. The LCD 2 bar graph is connected to and controlled by control unit 9 which forms narrow transparent apertures, such as 16 and 16' as shown in FIG. 1, at selected locations along the length of LCD 2. The position of transparent apertures 16 and 16' are selected by control unit 9 and allow the transmission of light through filter 1 onto the detector 3. The position of the apertures 16 and 16' which are located at selected positions beneath the linear variable optical filter 1 will, as a result, determine the wavelength $\lambda$ of radiation that is transmitted through the filter 1 onto quadrant detector 3.

The quadrant detector 3 is divided into four detector elements 3a, 3b, 3c and 3d with detectors 3a and 3c being located beneath one half of the LCD bar graph 2 (along its length) and detectors 3b and 3d being located beneath the other half of LCD 2. The length of the narrow transmissive apertures 16 and 16' in LCD 2 is about equal to or less than the width W' of each of the detector elements 3a to 3d, the LCD bar graph 2 being centered over a line separating adjacent detector elements 3a and 3c and a line separating adjacent detector elements 3b and 3d. The width W, in a direction perpendicular to the length of LCD2, of an image 11 formed on detector 3 by a laser beam transversing aperture 16 is preferably equal to the width W' of detector elements 3a or 3c. This would provide the strongest signal when image 11 is located entirely on one of the detector elements 3a or 3c. However, W could be shorter than W'. Filter 1, LCD 2 and quadrant detectors 3 have equal lengths and are superimposed one above the other. This arrangement effectively permits this LWR to obtain two detection channels tuned to different wavelengths one for aperture 16 and the other for aperture 16'.

In FIG. 1, an output from detector element 3a (signal A) is connected to a +input of differential amplifier 4 while the output from detector element 3b (signal B) is connected to the −input of differential amplifier 4. Similarly an output from detector element 3c (signal C) is connected to a +input of differential amplifier 4' and the output from detector element 3d (signal D) is connected to a −input of differential amplifier 4'. The output from differential amplifier 4 (signal E) is applied to the +input of a differential amplifier 5 and to a +input of summing amplifier 6. The output from differential amplifier 4' (signal F) is applied to the −input of differential amplifier 5 and to another +input of summing amplifier 6. The outputs from amplifiers 5 and 6 are applied to inputs of divider circuit 7 to provide an output 8 with the signal from 5 being divided into the signal from 6.

The system described with respect to FIG. 1 forms part of a LWR that is mounted aboard a platform such as an airplane. In operation, when a modulated laser beam 10 from a VLPL source for a laser beam rider (LBR) is aimed at the aircraft to guide a missile, that laser radiation will be transmitted through the optical filter 1 at a location where the filter 1 is transparent to the wavelength transmitted by the VLPL source. The linearly variable optical filter 1, when combined with LCD 2, forms a tunable optical filter. Knowing that the linearly variable optical filter 1 has the property to pass difference wavelengths as a function of the position on the filter, the LCD bar graph 2 under control by unit 9 can be used to produce two rectangular shaped narrow transparent apertures 16 and 16' corresponding to two wavelengths that are selected by control unit 9 to form images which are projected onto the quadrant detector 3. This arrangement allows the LWR to obtain two detection channels tuned to different wavelengths. Furthermore, the LCD 2 is driven by the control unit 9 to move the position of the two slots 16 and 16' in a manner such that a scanning in wavelength will occur up to the time when a VLPL source is detected.

The two transparent elongated apertures 16 and 16' generated by control unit 9 are centered over a pair of detector elements, 16 being centered over elements 3a and 3c with 16' being centered over 3b and 3d. Background radiation will pass through apertures 16 and 16' projecting images of the two apertures onto surfaces of the associated detector elements forming two rectangular light spots 12 and 12' as shown in FIG. 1. If a laser beam 10 has a wavelength that corresponds to the transmissive wavelength of one slot 16 that beam will project an image 11 of aperture 16 onto detector elements 3a and 3c. That laser beam will not project images of any other transparent apertures in LCD 2 onto detector elements since those other apertures would not be transmissive to the laser beam wavelength because of filter 1. It should be noted that only a well collimated beam 10 from a laser source will produce a sharp rectangular image 11 whereas background radiation or a poorly collimated beam of light will produce blurred rectangular images such as 12 and 12'.

The signals generated by uncollimated background radiation at areas 12 on detector 3a and area 12' on detector 3b are, more or less, equal. There will be some difference between the signals since apertures 16 and 16' are transmissive at difference wavelengths. However, subtracting signals generated by background radiation through slots 16 and 16', i.e. by projected images 12 and 12', on 3a and 3b will effectively produce almost a zero signal except for some residual signal created by the difference in transmissive wavelength between apertures 16 and 16'. Outside of that difference, the generated signals produced by background radiation on detectors 3a and 3b will effectively cancel each other when subtracted. The same principle applies for signals generated by detectors 3c and 3d from projected images 12 and 12'. However, signals generated by a well collimated beam 10 projecting an image of slot 16 onto detectors 3a and 3c will have no counterpart to be subtracted from signals generated by detectors 3b and 3d.

The quadrant detector 3 is comprised of four quadrant elements 3a, 3b, 3c and 3d and may be formed of silicon or by any other detector technology. It is also possible to use multiple detector technologies, mounted in a sandwich for instance, at the same time in order to provide wider optical bandwidth coverage. The use of a quadrant detector makes it possible to measure the position of the projected images of the slots at the surface of the detector along one axis. In this particular embodiment, that one axis would be along the width of transparent aperture 16. If the laser beam 10 arrives at an angle from the vertical in a plane perpendicular to elongated aperture 16, then that angle will displace the image 11 so that more of the image 11 is located on one of the detector elements 3a or 3c than the other. The position of projected images of a transparent slot such as 16 on a detector pair can be determined with differential amplifiers using signals generated by the four detector cells of the quadrant detector 3. The direction of arrival of an incident laser beam 10 at an angle from the vertical axis 15 can be determined by processing the signals from the four detector elements. Normally, that angle would be determined by the usual trigonometric function used in a quadrant detector based system wherein:

$$\theta_i = \arctan\left( \frac{[(A+B)-(C+D)] \cdot W}{(A+B+C+D) \cdot 2h} \right) \quad (1)$$

in which $\theta_i$ is the incident angle-of-arrival of the laser beam, h is the height of the LCD bar graph above the detector and W is the width of image 11 which, at its maximum, is preferably equal to the width W' of one of the four detectors 3a, 3b, 3c or 3d. However, in the circuit shown in FIG. 1 the signals A−B and C−D are obtained at differential amplifiers 4 and 4' rather than signals adding A+B and C+D as appear in equation (1). Therefore the equation that would now apply is:

$$\theta_i = \arctan\left( \frac{[(A-B)-(C-D)] \cdot W}{[(A-B)+(C-D)] \cdot 2h} \right) \quad (2)$$

which leads to a total field-of-view (FOV) of W/2h. This type of arrangement will typically provide an angular resolution of a few degrees. A LBR detection module as illustrated in FIG. 1 is only capable of measuring the angle of arrival (AOA) along one axis so that another module would be required to measure the AOA along another axis at right angles to that one axis. It should be noted that, although one of these detection modules is capable of measuring the AOA only for one axis, it does provide detection capability in other axis.

The signal subtraction process in the circuitry of FIG. 1 offers two decisive advantages. First, that subtraction can be effectively used to reject signals generated by non-laser sources which could cause false alarms. Secondly, the subtraction process will cancel out most of the background radiation generated signals such as radiation from the sun. Signals generated by non-laser sources are virtually eliminated because these are wide band sources that will generate practically equal signals in both detection channels at the same time, i.e. due to the two slots 16 and 16', which are then subtracted from each other. On the other hand, the bandwidth of a beam from a laser is only a few nanometers wide so that it will only be transmitted through one of the transparent slots formed in the LCD to provide a sharp rectangular image on a detector pair and, as a result, generate a signal into only one channel. Background radiation, which is also wide band, will be transmitted through both transparent slots onto the detector elements to generate signals in both channels which will be subtracted so that most of it will be neutralized. The four quadrant elements of the detector should have identical responsivity but some residual background signal will remain after subtraction because the background signal in each channel is slightly different due to the difference in wavelength tuning between the two transparent slots 16 and 16'. The requirement for all four detector elements to have the same responsivity is not a problem with quadrant detectors since all the elements usually originate from the same detector chip.

Figure 2:
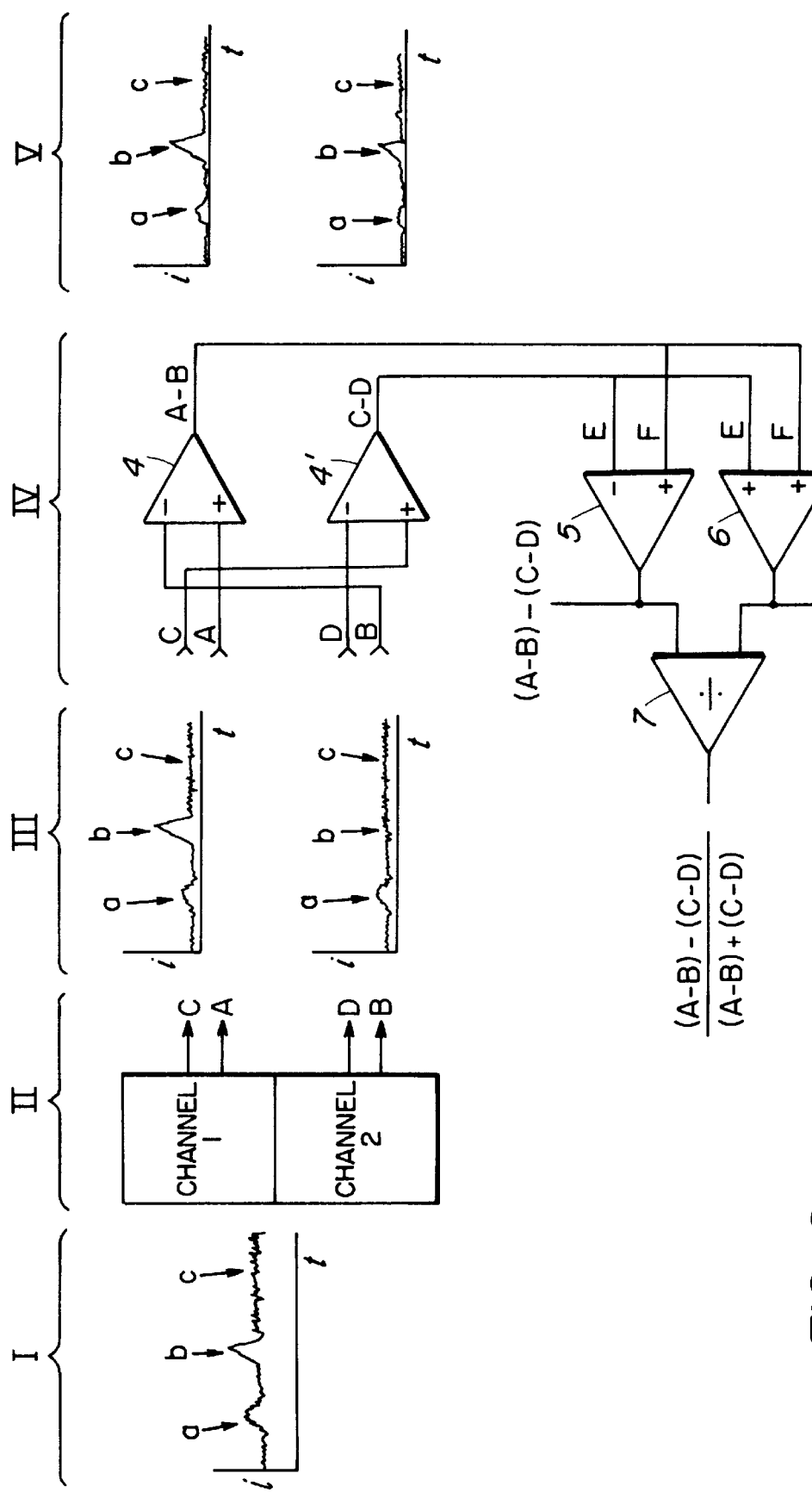
FIG. 2 illustrates by graphs of signals the effect on a signal detected by a LWR as shown in FIG. 1 when that LWR is tuned to the wavelength of a laser beam from a very low power laser (VLPL)

The graphs in FIG. 2 illustrate the effects on signals generated by detector 3 in the LWR of FIG. 1 at various points in the circuitry as that LWR is tuned to the wavelength of a laser beam 10. The same numbers have been used to identify similar circuit elements in FIGS. 1 and 2. In FIG. 1, two channels are effectively created by signals generated due to light transmitted through the two apertures 16 and 16'. The first channel is one for signals generated by light transmitted through aperture 16 onto detectors 3a and 3c while the second channel is one for signals generated by light transmitted through aperture 16' onto detectors 3b and 3d. The graph at I in FIG. 2 show a signal which normally would be generated over a period of time by incoming (unfiltered) light radiation arriving onto a detector, i.e. such as a signal generated by anyone of the detectors 3a, 3b, 3c or 3d when LCD2 is fully transparent and without filter 1. In this case, the signals generated by a laser pulse at point (b) is contaminated with signals generated by background radiation, i.e. a DC level, (the average height of signal at point (c) for instance), plus AC noise on that DC level. This graph also contain signals generated by sources of possible false alarms at point (a) such as those caused by a lightning flash, sun glint, gun-flash etc. which further contaminate signals that are generated by a laser pulse.

Referring back to FIG. 1, incoming light radiation identical to that described above (see Section I of FIG. 2) would normally be transmitted through filter 1 and the two transparent slot apertures 16 and 16' in LCD 2 onto quadrant detector 3 to generate output signals. The narrow rectangular apertures 16 and 16' effectively provide two channels, a Channel 1 for signals generated by light transmitted through aperture 16 and a Channel 2 for signals generated by light transmitted through aperture 16'. The light transmitted through aperture 16 would actually fall onto the two quadrant detectors 3a and 3c to provide two output signals A and C as indicated by the arrows for Channel 1 in Section II of FIG. 2. Similarly, the light transmitted through aperture 16' would fall onto the two quadrant detectors 3b and 3d (see FIG. 1) to provide two output signals B and D as indicated by the arrows for Channel 2 in Section II of FIG. 2.

The narrow apertures 16 and 16' in LCD 2 reduce the amount of background light transmitted through filter 1 onto the detector 3 which substantially lowers the amplitude of signals generated by background radiation transmitted through filter 1 as well as attenuating the signals generated by sources of false alarm. This is illustrated by points (c) and (a), respectively, on the graphs shown in Section III of FIG. 2 for Channel I and Channel 2. Only a single graph for the signals A and C (Channel 1 signals) is shown in Section III of FIG. 2 since those signals will be rather similar in profile. For the same reason, only a single graph is shown for output signals D and B (Channel 2 signals) in Section III of FIG. 2.

It should be particularly noted, referring to FIG. 1, that an arriving laser pulse 10 will only be transmitted through aperture 16 when that aperture is positioned along filter 1 at a location that is transparent to the narrow optical band wavelength of that laser pulse. No laser pulse radiation would be transmitted through aperture 16' since the filter 1 is not transparent to that radiation at the location of aperture 16'. This will completely eliminate any signal being generated in Channel 2 (signals B and D) by that laser pulse 10 as illustrated at point (b) in the Channel 2 graph (lower graph) in Section III of FIG. 2. However, the laser pulse transmitted through aperture 16 will appear as a sharp image 11 of aperture 16 on detectors 3a and 3c which will cause them to generate signals as illustrated at point (b) in the graph for Channel 1 (signals A and C) in Section III of FIG. 2. Since the signals generated by background radiation at point (c) and false alarms at point (a) for Channel 1 are substantially attenuated by aperture 16, the signal at point (b) produced by a laser pulse will be more easily differentiated from signals generated by other radiation sources. Although it was previously stated that signals C and A are similar in profile, there will be a difference in amplitude between the two signals depending on the angle of arrival of radiation from light sources and in particular the amplitude of signals generated from the sharp image 11 produced by a collimated laser beam 10. Referring to FIG. 1, the sharp image 11 produced by a laser beam could appear on a larger area of one of the detectors 3a or 3c than on the other if it arrives at an angle to the perpendicular to those detectors and this would produce a larger signal from that one detector than the other. The signals produced by a laser beam at point (b) for signals A and C would only be equal when that laser beam arrives from a direction that is perpendicular to the detectors.

The background radiation and sources of false alarms are, for the most part, wide band and, when transmitted through apertures 16 and 16', generate approximately equal signals in Channel 1 (A and C) and Channel 2 (B and D). There will be some difference due to the difference in wavelengths transmitted through apertures 16 and 16'. However subtracting signal B in Channel 2 from signal A in Channel 1 using a differential amplifier 4 as shown in Section IV of FIG. 2 will eliminate most of the signal generated by background radiation since they are nearly equal in both channels. This will also further attenuate signals produced by sources of false alarms. This is illustrated by the upper graph showing signal A–B in Section V of FIG. 2. In this case, a signal generated by a laser pulse will only appear in signal A and the process of subtracting signal B will not affect the signal generated by that laser pulse. Therefore, the laser pulse generated signal at point (b) in the upper graph of Section V will be more easily differentiate from the remainder of the much reduced signals generated by other sources. Similarly the signal D containing background generated signals and signals generated from false sources is substrated form signal C in differential amplifier 4' to provide a signal C–D which is illustrated in the lower graph of Section V in FIG. 2. The laser pulse generated signal at point (b) of this graph is again more easily differentiated from the much reduced signals generated by other light sources which are largely cancelled out due to the substraction process by differential amplifier 4'. This substraction of signals does not affect a laser pulse generated signal appearing in signal C since no laser pulse generated signal appears in signal D. This substraction of the signals provides a better signal to noise ratio for laser pulse detection and much less chance of electronic saturation when operating with very high gains.

It should be particularly noted that the amplitudes of the laser pulse generated signals in the upper and lower graphs of Section V are different, as illustrated at point (b) in both graphs. That signal amplitude of point (b) in both graphs of Section V will be dependent on the angle of arrival of the laser pulse. If the sharp image 11 (see FIG. 1) arrives from a direction so that more of it appears on detector 3a, which produce signal A, than on detector 3c, which produces signal C, then the amplitude of the laser pulse generated signal will be larger in signal A than in signal C. This difference in amplitude provides a method of determining the angle of arrival of a laser beam in accordance with Equation (2). The signal A−B from the output of differential amplifier 4 is applied to the +input of differential amplifier 5 while the C−D signal from differential amplifier 4' is applied to the −input to provide a signal (A−B)−(C−D) at the output of differential amplifier. The outputs from differential amplifiers 4 and 4' are applied to +inputs of amplifier 6 to provide an output (A−B)+(C−D) which equals (A+C)−(B+D), i.e. the difference signal from subtracting channel 2 from channel 1 appears at the output of 6. The output from 6 is divided into the output from 5 in divider 7 to provide an output $$\frac{(A-B)-(C-D)}{(A-B)+(C-D)} \tag{3}$$

from which the angle of arrival of a laser beam can be determined according to Equation 2.

Referring to FIG. 1, the wavelength tuning of the detection module is controlled by control unit 9 which is programmed to go through the complete optical bandwidth covered by filter 1 sequentially and periodically by forming transparent slots in the LCD 2 at selected positions along the length of filter 1. The control unit 9 will generally be programmed to stay at a particular wavelength pair, i.e. by forming transparent slots 16 and 16', for a certain period of time (dwell time) which is long enough to be sure to catch at least one laser pulse in a pulse train generated by a VLPL source. A dwell time of 100 μs would generally be sufficient as VLPL for LBRs usually operate at a few thousands of pulses per second. Once the wavelength of operation of a LBR has been acquired by this method, the control unit will lock onto the wavelength pair where the wavelengths for one channel receives a pulse but not the other in order to capture the threat source and provide continuous laser pulse detection. This detector module is also capable of adapting to various levels of background radiation by measuring the background noise output of the detector and by increasing or decreasing the width of the transparent slots formed in the LCD 2 by control unit 9. When high levels of background radiation exist, only one pair of slots would be made transparent in order to minimize the background noise. For low levels of background radiation, such as at night, more adjacent slots would be made transparent to form wider slots and increase the surface of detection on detector 3 and thus collect more photons.

Figure 3:
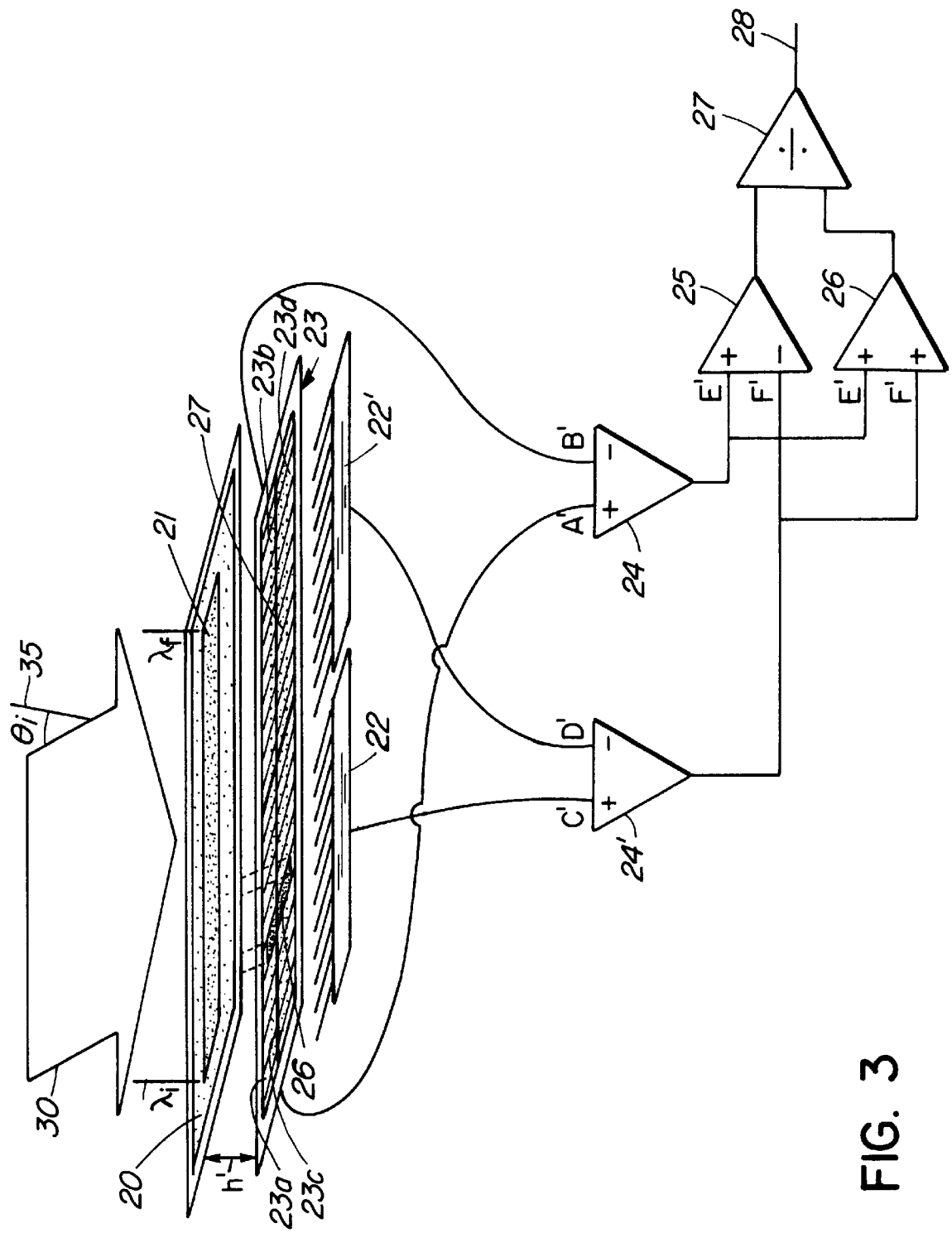
FIG. 3 illustrates a LWR according to another embodiment of the present invention.

FIG. 3 illustrates another LWR according to a further embodiment of the invention, one which does not use a LCD and wherein the quadrant detector elements are replaced by two linear arrays of detector elements. In this embodiment, a mask 20 fitted with a linearly variable optical filter 21 is positioned at a hight h' above two linear arrays of detector elements in detector 23.

The first linear array of detectors is formed by a linear array of detector elements 23a and an aligned linear array of detector elements 23b. In this embodiment the linear arrays 23a and 23b perform a similar function as that performed by the quadrant detector elements 3a and 3b in FIG. 1. The second linear array of detectors in FIG. 3 is formed by a linear array of detector elements 23c and an aligned linear array of detector elements 23d. The linear arrays 23c and 23d perform a similar function as that by the quadrant detector elements 3c and 3d in FIG. 1. The first and second linear arrays are adjacent each other with the linearly variable optical filter 21 being centered over the dividing line between the first and second linear arrays. The width of each detector element in the linear arrays is at least equal to or wider than the width of the linearly variable optical filter 21.

There is no LCD in this second embodiment between the filter and detector 23 which provided, in FIG. 1, transparent apertures through which radiation can be transmitted onto detector elements. Instead, this function is performed by the individual detector elements in the linear arrays which are each connected to a multiplexer (22 and 22' being shown in FIG. 3) with that multiplexer performing a scanning function along a linear array until a laser beam from a VLPL is detected. In FIG. 3, the multiplexer 22 will transmit any generated signal from individual detector elements in linear array 23c to the +input (signal C') of differential amplifier 24'. As to which detector element generated signal is selected, that will be determined by a control unit (not shown) for multiplexer 22. In a similar manner, signals generated by detector elements in linear array 23d are transmitted by multiplexer 22' to the −input (signal D') of differential amplifier 24'. Similar multiplexers (not shown) are connected to detector elements in linear array 23a and to detector elements in linear array 23b in order to transmit generated signals from elements in 23a and 23b to the +input (signal A') and −input (signal B'), respectively, of differential amplifier 24.

In the embodiment shown in FIG. 3, background radiation having a wide bandwidth will be transmitted through the filter 21 onto detector elements forming a diffuse image 27 of the filter on the detector 23. There will be some slight variation of signals generated by this background due to variations in wavelength transmitted by filter 21 along its length. However, subtracting the signals generated by background radiation on elements in 23d in differential amplifier 24' (signal D') from signals generated by background radiation on elements in 23c (signal C') will perform a similar function in cancelling each other as that performed by differential amplifier 4' in FIG. 1. In a similar manner, background radiation generated signals by detector elements 23a and 23b are subtracted at the + (signal A') and − (signal B') inputs of differential amplifier 24 to perform a similar cancelling function as differential amplifier 4 in FIG. 1. A beam from a VLPL source has a very narrow bandwidth and, as a result, will be transmitted only through a narrow portion along the length of filter 21 to form a sharp image 26 of that narrow portion onto detectors in arrays 23a and 23c. A portion of that image will form on a single, perhaps two depending on its position and width, detector in 23a and a portion on corresponding detector element(s) in 23c. Due to it's narrow image 26, no signal will be generated by that VLPL beam with detector elements 23b and 23d so that subtracting signals B' from A' and D' from C' in differential amplifiers 24 and 24' will only cancel background radiation generated signals leaving signals generated by image 26 more clearly detectable. Therefore, this embodiment of the invention operates in a similar manner as the one in FIG. 1 wherein the function of the slots 16 and 16' in FIG. 1 are now performed by the individual detector elements in the linear arrays 23 a, b, c and d and by the multiplexers (22 and 22' being shown) used to address the individual detector elements.

The output E' from differential amplifier 24, i.e. A'−B', is applied to the +input of amplifier 26 and the output F' from differential amplifier 24' is applied to the other +input of amplifier 26 whose output is applied to divider 27. The output E' from differential amplifier 24, i.e. (A'–B') is applied to the +input of differential amplifier 25 and the output F' from differential amplifier 24' is applied to the input of differential amplifier 25 whose output is applied to the other input of divider 27. These operate in the same manner as differential amplifiers 4, 4', 5, amplifier 5' and divider 7 in FIG. 1 to provide an output 28 from divider 27. The angle-of-arrival $\theta_j$, can then be determined from output 28 in a manner similar to that for output 8 in FIG. 1.

Various modifications may be made to the described embodiments without departing from the spirit and scope of the invention as defined in the appended claims.

The embodiments of the invention in which an exclusive property or privilege is claimed are defined as follows:

1. An opto-electronic device for detecting a collimated beam of radiation comprising a linearly variable optical filter superimposed over but spaced from, an elongated detector having a plurality of radiation detector elements with at least one detector element extending perpendicular to the length of the elongated detector being located in each quadrant of the elongated detector, which elements have a width W' in a direction perpendicular to the length of the elongated detector, wherein radiation that transverses said filter projects an image of at least a first portion of the filter onto at least two adjacent detector elements, each of which are located in separate ones of two quadrants at one end of the elongated detector, and also projects an image of at least a second portion of the filter onto at least two adjacent detector elements, each of which are located in separate ones of two quadrants at another end of the detector, the width W of those images at a location where they are projected onto the elongated detector being $\leq$ the width W' of each detector element; the first and second portions having substantially the same dimensions with the device having means for subtracting a signal generated by radiation that transverses said filter onto at least one detector in a quadrant at said another end from a signal generated by radiation that transverses said filter onto at least one detector in an aligned quadrant at said one end to provide two difference signals at outputs which are connected to processing electronics, the means for subtracting reducing noise generated by background radiation to enable easier detection of a narrow optical band collimated beam of radiation, the processing electronics having means to determine the direction of arrival in one plane of such a collimated beam of radiation from the difference signals.

2. An opto-electronic device for detecting a collimated beam of radiation comprising a linearly variable optical filter superimposed over, but spaced from, an elongated quadrant detector having a single radiation detector element in each quadrant of the detector, the detector elements having a width W' in a direction perpendicular to the length of the elongated quadrant detector; a liquid crystal display being located between the optical filter and quadrant detector at a distance h from the quadrant detector, the liquid crystal display being connected to a control unit designed to form at least two narrow rectangular transparent apertures at selected locations in the liquid crystal display wherein the narrow apertures are perpendicular to the length of the elongated quadrant detector and have a width perpendicular to the length of the elongated quadrant detector $\leq$ the width W' of a detector element, the liquid crystal display being centered over a center line located along the length of the elongated quadrant detector, one aperture being located above two adjacent detector elements at one end of the quadrant detector with a second aperture being located above two adjacent detector elements at another end of the quadrant detector wherein radiation that transverses said apertures project images of said apertures onto detector elements, the images having substantially the same dimensions with a width W perpendicular to the length of the elongated quadrant detector where W$\leq$W', the device having means for subtracting a signal generated by radiation that transverses said second aperture onto each detector at said another end from a signal generated by radiation that transverses said one aperture onto aligned detectors at said one end to provide two difference signals at two outputs which are connected to processing electronics, the means for subtracting reducing noise generated by background radiation to enable easier detection of a narrow optical band collimated beam of radiation, the processing electronics having means to determine the angle of arrival in one plane of such a collimated beam from the difference signals.

3. An opto-electronic device as defined in claim 2, wherein the thickness of the transparent apertures along the length of the elongated quadrant detector is selectable and under control of said control unit.

4. An opto-electronic device as defined in claim 2, wherein the means for subtracting are two differential amplifiers each having a +input connected to an output of separate detector elements at said one end of the quadrature detector with each differential amplifier having a –input connected to an aligned detector element at said another end of the quadrature detector, said two outputs being outputs from the two differential amplifiers.

5. An opto-electronic device as defined in claim 4, wherein said means to determine the angle of arrival is a further differential amplifier having an output connected to an input of a divider circuit, another input of the divider circuit being connected to an output of a summing device having inputs connected to said two outputs, one of said two outputs that provide said difference signals being connected to a +input of said further differential amplifier and another of said two outputs that provide said difference signals, being connected to a –input of said further differential amplifier, the angle of arrival of a collimated beam being the arctan of an output of the divider circuit when multiplied by a predetermined constant W/2h.

6. An opto-electronic device as defined in claim 3, wherein the means for subtracting are two differential amplifiers each having a +input connected to an output of separate detector elements at said one end of the quadrature detector with each differential amplifier having a –input connected to an aligned detector element at said another end of the quadrature detector, said two outputs being outputs from the differential amplifiers.

7. An opto-electronic device as defined in claim 6, wherein said means to determine the angle of arrival is a further differential amplifier having an output connected to an input of a divider circuit, another input of the divider circuit being connected to an output of a summing device having inputs connected to said two outputs, one of said two outputs that provide said difference signals being connected to a +input of said further differential amplifier and another of said two outputs that provide said difference signals, being connected to a –input of said further differential amplifier, the angle of arrival of a collimated beam being the arctan of an output of the divider circuit when multiplied by a predetermined constant W/2h.

8. An opto-electronic device for detecting a collimated beam of radiation comprising a linearly variable optical superimposed over, but spaced from, an elongated detector having a plurality of narrow radiation detector elements that extend perpendicular to the detector's length in two adjacent arrays that extend along said length, the optical filter being located at a distance h' from the detector and centered over a line between the two arrays with the width of the filter being < the width W' of the detector elements in an array wherein radiation that transverses said filter projects an image onto the arrays, which image has a width W perpendicular to the detector's length where W≦W', the arrays being divided into two sections with all the detector elements located in a half of each array at one end of the elongated detector being connected to inputs of a multiplexer and all the detector elements located in a half of that array at another end of the elongated detector being connected to inputs of another multiplexer, the multiplexers being connected to a control unit that determines which detector element outputs are selected for further processing; the device having means for subtracting signals transferred by a multiplexer connected to detector elements in an array at said another end from signals transferred by a multiplexer connected to detector elements in that array at said one end to provide two difference signals at two outputs which are connected to processing electronics, the means for subtracting reducing noise generated by background radiation that transverses said filter onto detector elements to enable easier detection of a narrow optical band collimated beam of radiation, the processing electronics having means to determine the angle of arrival in one plane of such a collimated beam from said difference signals.

9. An opto-electronic device as defined in claim 7, wherein the means for subtracting signals is two differential amplifiers, one of said two differential amplifiers having a +input connected to a multiplexer associated with detector elements in one array at said one end and a −input connected to a multiplexer associated with detector elements in said one array at said another end, another of said two differential amplifiers having a +input connected to a multiplexer associated with detector element in a second array at said one end and a −input connected to a multiplexer associated with detector elements in said second array at said another end, said two outputs being outputs from the two differential amplifier.

10. An opto-electronic device as device in claim 7, wherein said means to determine the angle of arrival is a further differential amplifier having an output connected to an input of a divider circuit, another input of the divider circuit being connected to an output of a summing device having inputs connected to said two outputs, one of said two outputs that provide said difference signals being connected to a +input of said further differential amplifier and another of said two outputs that provide said difference signals being connected to a −input of said further differential amplifier and wherein the angle of arrival of a collimated beam is determined from the arctan of an output of the divider circuit when multiplied by a predetermined constant W/2h.

\* \* \* \* \*